United States Patent [19]

Mizokami

[11] Patent Number: 4,457,602

[45] Date of Patent: Jul. 3, 1984

[54] MULTIPLE LIGHT EMISSION CONTROL SYSTEM UTILIZING ELECTRONIC FLASHES

[75] Inventor: Kazunori Mizokami, Hachioji, Japan

[73] Assignee: Olympus Optical Company Ltd., Tokyo, Japan

[21] Appl. No.: 369,153

[22] Filed: Apr. 16, 1982

[30] Foreign Application Priority Data

Apr. 20, 1981 [JP] Japan .................................. 56-59418
Apr. 20, 1981 [JP] Japan .................................. 56-59419

[51] Int. Cl.³ ............................................. G03B 15/05
[52] U.S. Cl. .................................... 354/416; 354/476; 354/132; 354/145.1
[58] Field of Search ................................... 354/32-35, 354/60 F, 132, 133, 137, 139, 145, 149; 315/151-153, 241 P, 323

[56] References Cited

U.S. PATENT DOCUMENTS

| | | | |
|---|---|---|---|
| 3,568,582 | 3/1971 | Uchida | 315/241 P X |
| 3,614,918 | 10/1971 | Hennig et al. | 354/33 X |
| 3,726,197 | 4/1973 | Hasegawa et al. | 354/33 X |
| 4,190,335 | 2/1980 | Maitani | 354/145 X |
| 4,242,616 | 12/1980 | Takematsu | 354/132 X |
| 4,360,764 | 11/1982 | Yagi | 315/241 P |

FOREIGN PATENT DOCUMENTS

| | | | |
|---|---|---|---|
| 2462526 | 10/1977 | Fed. Rep. of Germany | 354/33 |
| 52-26711 | 9/1978 | Japan | |
| 2065316 | 6/1981 | United Kingdom | 354/145 |

Primary Examiner—William B. Perkey
Attorney, Agent, or Firm—Louis Weinstein

[57] ABSTRACT

A multiple light emission control system delivers an emission initiate signal and an emission interrupt signal to each of a plurality of electronic flashes from a camera, in accordance with an adjustable circuit for establishing a relative proportion of flashlight emission from the plurality of electronic flashes.

16 Claims, 17 Drawing Figures

F I G. 13
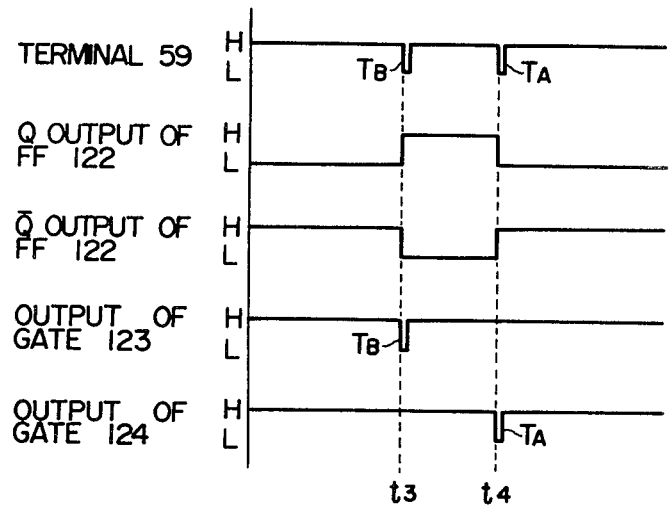
F I G. 14
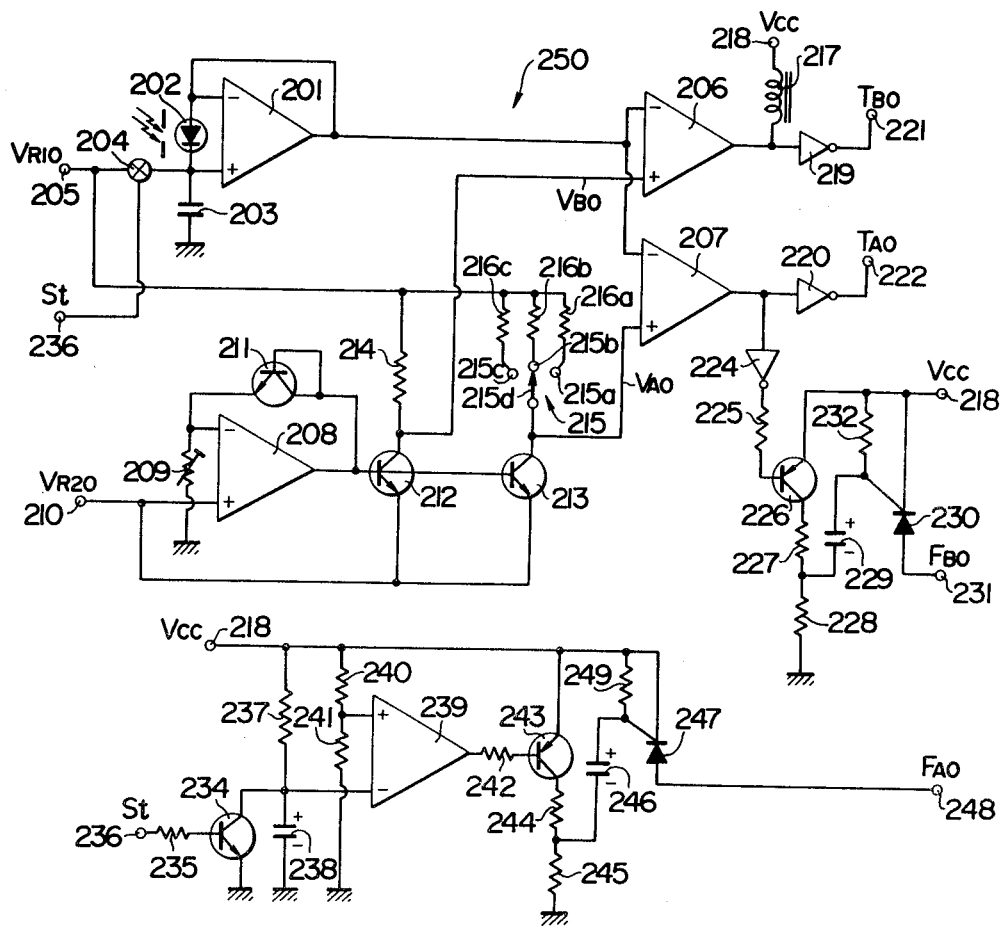

MULTIPLE LIGHT EMISSION CONTROL SYSTEM UTILIZING ELECTRONIC FLASHES

BACKGROUND OF THE INVENTION

The invention relates to a multiple light emission control system utilizing electronic flashes, and more particularly, to such a system in which the emission of light from a plurality of electronic flashes is controlled to different values, in a flash photography of the type in which the emission of flashlight from the electronic flashes is automatically interrupted in response to an emission interrupt signal produced whenever a proper exposure has been determined as a result of the interception by a photometric element disposed within a camera of light passing through a taking lens of the camera after being reflected from an object being photographed which is illuminated by the flashlight from the electronic flashes.

FIG. 1 illustrates an exemplary arrangement to provide a multiple light photography utilizing a plurality of electronic flashes. As shown, a pair of electronic flashes A and B are connected to a single camera C. Such an arrangement is frequently used to take a picture while supplying suitable amounts of light to an object D being photographed from both lateral sides. In this instance, the relative amount of light emitted from the both electronic flashes A and B can be adjusted so that the object can be illuminated in a stereographical manner, thus permitting a photographer to produce an image construction as intended.

In the prior art practice, a number of different techniques can be employed to change the relative amount of emission from the electronic flashes. By way of example, different guide numbers may be used on the individual electronic flashes A and B, which are then manually operated for emission of the flashlight. Alternatively, different ND (neutral density) filters may be mounted on the respective electronic flashes A and B in order to control the emission of light therefrom. As a further alternative, the point in time when the emission of flashlight from the respective electronic flashes A and B is initiated is displaced from each other, thereby controlling the emission of flashlight.

Recently, an arrangement which is commonly referred to as TTL "auto-strobo" is in practical use, and can be used to effect a multiple light photography. In this instance, a plurality of "strobos" are used, which are electronic flashes having the capability to terminate the emission of light in response to a signal which is internally produced within an individual electronic flash or supplied externally from an associated camera. When this is applied to the arrangement shown in FIG. 1, since the electronic flashes A and B, representing such "strobos", are controlled by an emission interrupt signal from the camera C, it follows that the emission of light from the electronic flashes will be equal to each other if the electronic flashes A and B are disposed at an equal distance from the object D. The change the emission of light supplied from the respective electronic flashes A and B upon the object D, they must be located at different distances from the latter. However, a practical manner of establishing such distances depends solely on the perception of the situation by the photographer. Also there are occurrences in which satisfactory distances cannot be assured, depending on the location where the picture is taken. Thus it follows a control of the relative emission of light from a plurality of electronic flashes must resort to a manual photographing technique.

SUMMARY OF THE INVENTION

It is a first object of the invention to provide a multiple light emission control system utilizing a plurality of electronic flashes for a TTL flashlight photography which permits the emission of light from individual electronic flashes to be established at a suitable ratio desired by a photographer in a variable manner.

It is a second object of the invention to provide a multiple light emission control system utilizing a plurality of electronic flashes for a TTL flashlight photography in which the interruption of emission of light from one of the electronic flashes initiates the emission of light from another electronic flash until the individual electronic flashes are sequentially operated one by one to achieve a desired ratio of emission of light which is initially established.

In accordance with the invention, a ratio or relative proportion of the emission of light from a plurality of electronic flashes can be simply changed as desired in accordance with the intent of a photographer, thereby enabling a stereographical illumination of an object being photographed. By disposing the individual electronic flashes at an equal distance from the object and by changing the relative emission of light supplied from the individual electronic flashes, a satisfactory flashlight photography which fully reflects the intent of a photographer can be achieved without undue restriction by the location where a picture is taken.

In addition, the plurality of electronic flashes can be activated one by one in a sequential manner, and the emission of light from the individual electronic flashes can be controlled as desired, facilitating a flashlight photography which fully reflects the intent of a photographer under multiple light illumination.

BRIEF DESCRIPTION OF THE DRAWINGS

FIG. 13 is a series of timing charts illustrating the level of signals appearing at various parts of the electronic flash shown in FIG. 11;

FIG. 14 is a circuit diagram of a multiple light emission control system according to still another embodiment of the invention;

DESCRIPTION OF PREFERRED EMBODIMENTS

Figure 2:
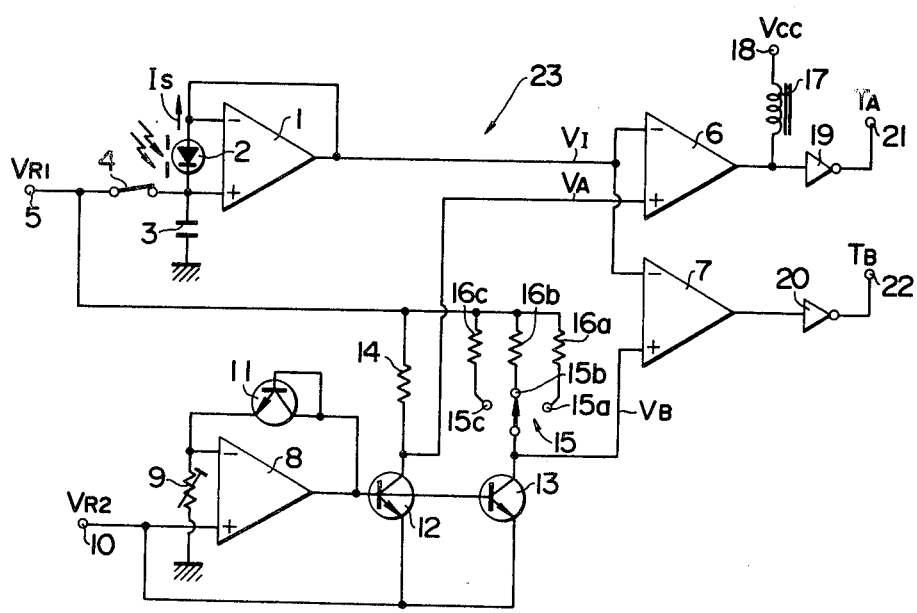
FIG. 2 is a circuit diagram of a multiple light emission control system according to one embodiment of the invention.

Referring to FIG. 2, there is shown a circuit diagram of a multiple light emission control system according to one embodiment of the invention. It is to be noted that the electrical circuit shown is adapted to be disposed within a single lens reflex camera which effects TTL photometry. The system includes an operational amplifier 1 having its inverting and its non-inverting input terminals connected to the anode and the cathode, respectively, of a photoelectric transducer element 2, such as a photodiode, which is used for the purpose of photometry. The non-inverting input terminal is connected to the ground through an integrating capacitor 3, and is also connected through a trigger switch 4, which is opened in interlocked relationship with an upward movement of a movable mirror upon shutter release, to a terminal 5, to which a first reference voltage VR1 is applied. The inverting input terminal of the operational amplifier 1 is connected to its output terminal, which is in turn connected to the inverting input terminal of other operational amplifiers 6 and 7, each of which forms a comparator. In this arrangement, the amplifier 1 forms a circuit which integrates a photocurrent produced by the transducer element 2.

A film speed presetting circuit includes an operational amplifier 8 having its inverting input terminal connected to the ground through a variable resistor 9 which is adjusted in accordance with a desired film speed. The non-inverting input terminal of the amplifier 8 is connected to a terminal 10, to which a second reference voltage VR2 is applied. The inverting input terminal of the amplifier 8 is also connected to the emitter of an NPN transistor 11, the base and collector of which are connected in common and connected to the output terminal of the amplifier 8. The transistor 11 provides a logarithmic compression.

The output terminal of the amplifier 8 is connected to the base of NPN transistors 12, 13 which serve to provide logarithmic expansion. The collector of the transistor 12 is connected to the non-inverting input terminal of the amplifier 6 and is also connected to the terminal 5 through a resistor 14 which is utilized to preset the amount of the emission of light. The collector of the transistor 13 is connected to the non-inverting input terminal of the amplifier 7 and is also connected to a movable contact of a changeover switch 15 having a plurality of fixed contacts 15a, 15b, 15c, which are connected to one ends of resistors 16a, 16b, 16c, the other end of which are connected in common to the terminal 5. The resistors 16a to 16c are each adjusted to preset a given amount of light emission, and the switch 15 is operable to choose a particular value of the relative emission of light. The transistors 12, 13 have their emitters connected in common and connected to the terminal 10. The output terminal of the amplifier 6 is connected to a terminal 18, to which a supply voltage Vcc is applied, through a coil 17 of an electromagnet which serves to constrain a second shutter blind when a shutter is in its charged condition. In addition, the output terminal of the amplfier 6 is connected through an inverter 19 to an output terminal 21 where an emission interrupt signal is developed. The output terminal of the amplifier 7 is connected through an inverter 20 to another output terminal 22 where an emission interrupt signal is developed. It is to be understood that the output terminal 21 delivers an emission interrupt signal $T_A$ to the electronic flash A (see FIG. 1) while the output terminal 22 delivers another emission interrupt signal $T_B$ to the electronic flash B (see FIG. 1).

Figure 3:
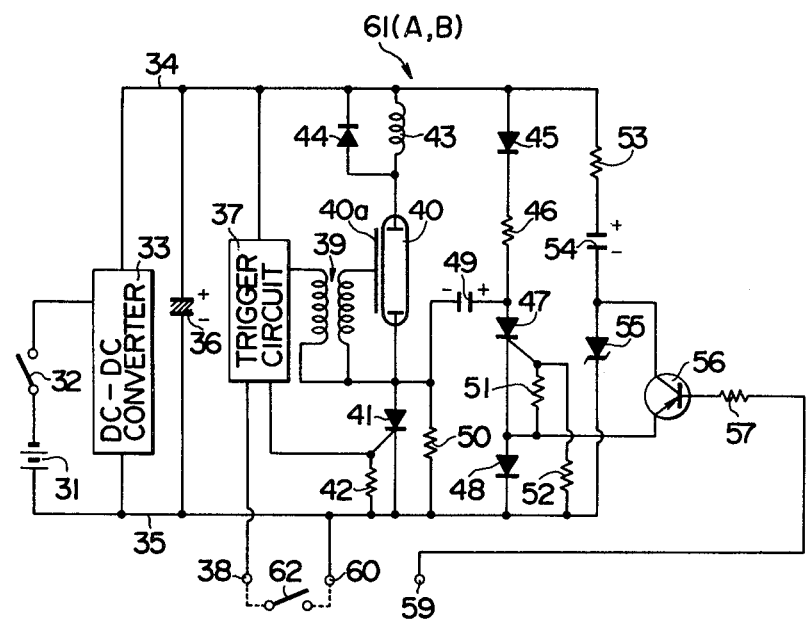
FIG. 3 is a circuit diagram of one form of a TTL electronic flash which is adapted to cooperate with the multiple light emission control system shown in FIG. 2.

FIG. 3 shows the electrical circuit of an electronic flash A or B having the capability to terminate the emission of light therefrom in response to the emission interrupt signal $T_A$, $T_B$ supplied from the multiple light emission control system 23. In FIG. 3, a battery 31 is connected in series with a power switch 32, and a DC—DC converter 33 is connected across the combination of the battery and the switch to feed a pair of buses 34, 35. A main capacitor 36 is connected across the buses, and is charged as the power switch 32 is closed. A trigger circuit 37 is connected to the bus 34, and includes a trigger input terminal which is connected to a terminal 38, to which an emission initiate signal is applied in synchronized relationship with the closure of synchro contacts 62 which are disposed on the port of the camera. The trigger circuit 37 includes an output terminal which is connected to one end of a primary coil of a trigger transformer 39 having a secondary coil, one end of which is connected to a trigger electrode 40a of a flash discharge tube 40, the other end of both the primary and the secondary coils being connected in common and connected to one end of the tube 40 which is in turn connected to the anode of a thyristor 41 having its cathode connected to the bus 35. The gate of the thyristor 41 is connected to the trigger circuit 37 and is also connected through a resistor 42 to the bus 35. The other end of the tube 40 is connected through a coil 43 shunted by diode 44 to the bus 34. A series circuit including a diode 45, resistor 46, thyristor 47 and diode 48 is connected across the buses 34, 35, with the junction between the resistor 46 and the thyristor 47 connected with the bus 35 through a series combination of a commutating capacitor 49 and resistor 50. The junction between the capacitor 49 and the resistor 50 is connected to said one end of the tube 40. The gate of the thyristor 47 is connected to the cathode thereof through a resistor 51, and is also connected to the bus 35 through a resistor 52. Another series circuit including a resistor 53, a capacitor 54 and Zener diode 55 is connected across the buses 34, 35, with the anode of the diode 55 being connected to the collector of PNP transistor 56. The transistor 56 has its emitter connected to the anode of the diode 48 and has its base connected through a resistor 57 to a terminal 59, to which the emission terminate signal is applied. It will be seen that the bus 35 is connecting to a ground terminal 60.

Figure 1:
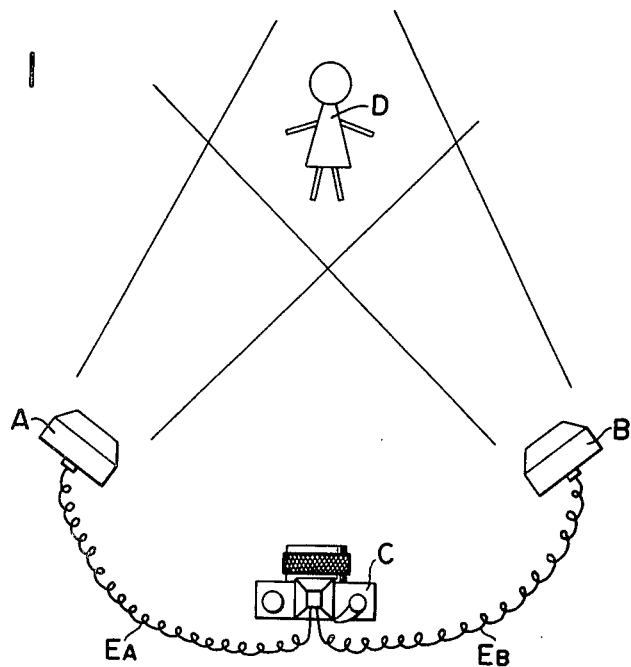
FIG. 1 is a schematic view of an arrangement for a multiple light flashlight photography utilizing a plurality of electronic flashes.

The operation of the multiple light emission control system 23 shown in FIG. 2 will be described below together with the operation of the electronic flash 61 (A, B) shown in FIG. 3. Initially, as indicated in FIG. 1, the single lens reflex camera C of TTL direct photometry type and incorporating the multiple light emission control system 23 mentioned above is connected with the pair of TTL electronic flashes A, B (as mentioned previously, these electronic flashes have the capability to terminate their emission of light in response to a signal generated internally therein or applied externally), through connection cords $E_A$, $E_B$. The electronic flashes A, B are disposed at an equal distance from the object D being photographed, and are directed toward the latter. The ratio or relative proportion of emission of light from both electronic flashes is preset in accordance with the photographing intent of a photographer, by switching the changeover switch 15 to a desired position in order to change the relative emission of light. It is assumed here that the resistors 14 and 16a have a resistance R, the resistor 16b a resistance $R/n_1$, and the resistor 16c a resistance $R/n_2$, where $n_1 < n_2$. It is also assumed that the switch 15 is thrown to the contact 15b so that the resistor 16b is connected to the collector of the transistor 13.

Figure 4:
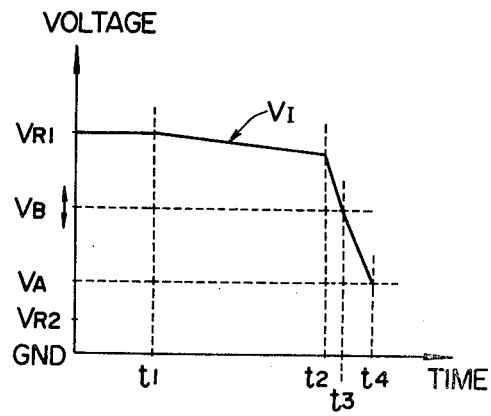
FIGS. 4 and 5 graphically illustrate a change in an integrated voltage which occurs in the multiple light emission control system shown in FIG. 2, as plotted against time.

When the power switch 32 of the electronic flash 61 (A, B) is closed, the main capacitor 36 is charged. In response to the depression of a shutter button of the camera C, the movable mirror moves up, closing the power switch (not shown) of the camera. This applies the supply voltage $V_{cc}$ and reference voltages VR1, VR2 in the circuit arrangement of FIG. 2. The application of the reference voltage VR1 to the terminal 5 causes the integrating capacitor 3 to be charged through the trigger switch 4. The application of the reference voltage VR2 to the terminal 10 produces a current flow of $VR2/(R_{ASA})$ through the variable resistor 9 where $R_{ASA}$ represents the resistance of the variable resistor 9. As a result, a logarithmically compressed voltage $V_{ASA} = (kT/q)\ln(VR2/R_{ASA})$ is developed at the output terminal of the amplifier 8. Here, k represents Boltzmann's constant, T absolute temperature, q the charge of an electron. The voltage $V_{ASA}$ represents film speed information established by the variable resistor 9, and is applied to the base of the transistors 12, 13. The resistors 11, 12, 13 form together a current mirror circuit, whereby the voltage $V_{ASA}$ is expanded to produce a current flow of $VR2/R_{ASA}$ through the collector of the transistors 12, 13. Accordingly, the collector potential VA of the transistor 12 is $VA = VR1 - VR2(R/R_{ASA})$ while the collector potential VB of the transistor 13 is $VB = VR1 - VR2(R/n_1 R_{ASA})$. As will be appreciated, the voltage VA defines a decision level for the operational amplifier 6 and the voltage VB defines a decision level for the operational amplifier 7. As shown in FIG. 4, there applies an inequality $VR1 > VB > VA > VR2$.

When the movable mirror completes its upward movement to allow a first shutter blind to initiate running, the trigger switch 4 is opened, whereby the integrating capacitor 3 which has been charged to a level corresponding to the reference voltage VR1 begins discharging at time $t_1$. The discharge occurs in accordance with the photocurrent Is from the photoelectric transducer element 2 which is produced in response to the incidence of light from an object being photographed, thus initiating an integrating operation. In this manner, the amplifier 1 produces an integrated voltage $VI = VR1 - 1/C \int Is \, dt$ as indicated in FIG. 4, which is applied to the amplifiers 6, 7. Here, C represents the capacitance of the integrating capacitor 3. Since the integrated voltage VI is greater than either decision level VA, VB under this condition, the amplifiers 6, 7 produce a negative output, providing a positive level at the terminals 21, 22. The coil 17 remains energized to constrain a second shutter blind from running.

When the first shutter blind has completed its running to fully open the shutter, synchro contacts 62, shown across the terminals 38, 60 in FIG. 3, are closed at this time $t_2$. Thereupon, the trigger circuit 37 is activated, developing a trigger pulse which is coupled through the trigger transformer 39 to be applied to the trigger electrode 40a of the discharge tube 40. Simultaneously, a gate pulse is applied to the gate of the thyristor 41, thus allowing the emission of light from the flash discharge tube 40. It is to be understood that the timing $t_2$ of emitting light from both electronic flashes A, B is synchronized. In response to the emission of light from these electronic flashes, the object D is illuminated from both lateral sides, as viewed in FIG. 1, whereby the light reflected therefrom impinges directly upon the transducer element 2 within the camera C. As a result, the integrated voltage VI begins to fall at an increased rate from time $t_2$ on.

As the integrated voltage VI decreases below the decision level VB at time $t_3$, the amplifier 7 changes its output to a positive value, whereby there occurs a negative level at the output terminal 22. The negative level developed at the output terminal 22 is applied, as an emission terminate signal $T_B$, to the base of the transistor 56 through the input terminal 59 which is contained in the electronic flash B, thus turning the transistor 56 on. The capacitor 54 has been charged to the same potential as the capacitor 36, as the latter has been charged, and now discharges through a path including the resistor 53, coil 43, tube 40, thyristor 41 and Zener diode 55, thus developing a given voltage, which is defined by a Zener breakdown voltage, across the Zener diode 55. When the transistor 56 is turned on, the constant voltage developed across the Zener diode 55 acts as a power supply to allow the emitter current of the transistor 56 to flow through the gate-cathode path of the thyristor 47, thus turning it on. Thereupon, the commutating capacitor 49 which has been charged to the polarity shown now discharges to turn the thyristor 41 off, whereby the discharge circuit of the flash discharge tube 40 is interrupted, terminating the emission of light therefrom.

On the other hand, even after the electronic flash B has terminated its emission of light, the other electronic flash A continues its emission of light until the integrated voltage VI reaches the decision level VA. When the integrated voltage VI decreases below the decision level VA at time $t_4$, the amplifier 6 produces a positive output, whereby the level at the output terminal 21 changes to the negative. The negative level developed at the output terminal 21 is applied, as the emission terminate signal $T_A$, through the input terminal 59 to the base of the transistor 56 contained in the electronic flash A, thus turning it on. The emission of light from the flash discharge tube 40 of the electronic flash A is terminated, in a manner similar to that mentioned above. At the same time as the emission terminate signal $T_A$ is produced, the coil 17 is deenergized, terminating the constraint imposed upon the second shutter blind, which therefore begins running to terminate an exposure.

Figure 5:
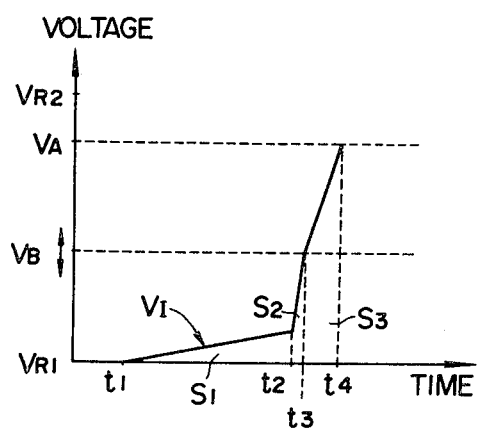

It will be noted that the decision level VB for the operational amplifier 7 which is used to control the emission of light from the electronic flash B is changed by the changeover switch 15, and hence when it is thrown to the fixed contact 15a so that the resistor 16a is connected to the collector of the transistor 13, the decision level VB will be equal to the decision level VA since the resistor 16a has the resistance R which is equal to that of the resistor 14. Accordingly, if a picture is taken under this condition utilizing the electronic flashes A and B in the manner mentioned above, the emission terminate signals $T_A$, $T_B$ developed at the output terminals 21, 22 will occur simultaneously, thus causing both electronic flashes A, B to terminate their emission of light at the same time. When the changeover switch 15 is thrown to the fixed contact 15c to connect the resistor 16c to the transistor 13, the decision level VB will be higher than the decision level shown in FIG. 4 chosen when the resistor 16b is chosen, since the resistor 16c has a resistance of $R/n_2(n_2>n_1)$. Accordingly, the emission terminate signal $T_B$ will occur earlier than the occurrence of the emission terminate signal $T_A$. In other words, the emission of light from the electronic flash B will be reduced as compared with the emission of light from the electronic flash A. FIG. 5 graphically shows the integrated voltage VI on a reversed scale. It will be seen that an area $S_1$ encompassed below the curve from time $t_1$ to $t_2$ represents an amount of exposure supplied by natural light, an area $S_2$ defined between times $t_2$ and $t_3$ represents an amount of exposure provided by the flashlight from both electronic flashes A, B, and an area $S_3$ defined between times $t_3$ and $t_4$ represents an amount of exposure supplied by the flashlight from the electronic flash A alone. By changing the time $t_3$ when the emission of light from the electronic flash B is terminated, by operating the changeover switch 15, it will be seen that the relative emission of light from the electronic flashes A and B can be suitably chosen.

Figure 6:
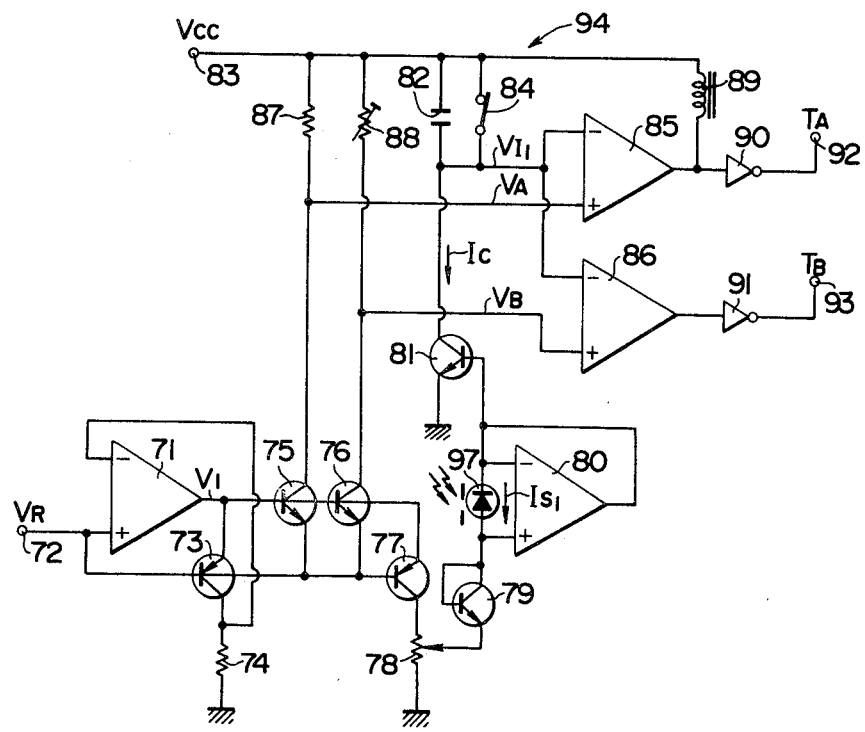
FIG. 6 is a circuit diagram of a multiple light emission control system according to another embodiment of the invention.

FIG. 6 is a circuit diagram of a multiple light emission control system according to another embodiment of the invention. Specifically, an operational amplifier 71 includes a non-inverting input terminal which is connected to a terminal 72, to which a reference voltage VR is applied. The amplifier 71 also includes an inverting input terminal which is connected to the collector of PNP transistor 73 and also connected to the ground through a resistor 74. The transistor 73 has its base connected to the terminal 72 and its emitter connected to the output terminal of the amplifier 71. The output terminal of the amplifier 71 is connected to the bases of PNP transistors 75 and 76 and also to the emitter of NPN transistor 77. The transistor 77 has its base connected to the base of the transistor 73 and to the emitters of the transistors 75, 76. The collector of the transistor 77 is connected to the ground through a variable resistor 78 which is used to establish a film speed. The variable resistor 78 has a movable tap which is connected to the emitter of NPN transistor 79. The transistor 79 has its base and collector connected together and connected to the non-inverting input terminal of another operational amplifier 80. A photoelectric transducer element 97 such as photodiode, which is provided for purpose of photometry, has its anode connected to the non-inverting input terminal and its cathode connected to the inverting input terminal of the amplifier 80. The inverting input terminal is connected to the output terminal of the amplifier 80 and is also connected to the base of NPN transistor 81. The transistor 81 has its emitter connected to the ground and its collector connected through an integrating capacitor 82 to a terminal 83, to which a supply voltage Vcc is applied. A trigger switch 84 is connected in shunt with the integrating capacitor 82 and is adapted to be opened in response to a shutter release. The collector of the transistor 81 is also connected to inverting input terminals of operational amplifiers 85, 86, each of which forms a comparator. The non-inverting input terminal of the amplifier 85 is connected to the collector of the transistor 75, and is also connected to the supply terminal 83 through a resistor 87 which is chosen to correspond to a given amount of light. The non-inverting input of the amplifier 86 is connected to the collector of the transistor 76, and is also connected to the supply terminal 83 through a semi-fixed resistor 88 which is used to establish a given relative emission of light. The output terminal of the amplifier 85 is connected to the supply terminal 83 through a coil 89 of an electromagnet which is effective to constrain a second shutter blind, and is also connected through an inverter 90 to an output terminal 92 which is adapted to deliver an emission terminate signal $T_A$. The output terminal of the amplifier 86 is connected through an inverter 91 to an output terminal 93 which is adapted to deliver an emission terminate signal $T_B$.

Figure 7:
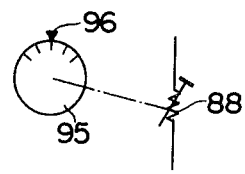
FIG. 7 is a front view of one form of a variable dial which operates a semi-fixed resistor for changing the relative emission of light in the arrangement of FIG. 6.

In operation of the multiple light emission control system 94 shown in FIG. 6, the camera C incorporating the control system 94 is connected with the electronic flashes A and B (see FIGS. 1 and 3), and then the semi-fixed resistor 88 is suitably adjusted to establish a desired relative emission of light. As shown in FIG. 7, a dial 95 may be disposed on the exterior of the camera to allow an adjustment of the resistance of the semi-fixed resistor 88. Representing the resistance of the resistor 87 by $R_1$, the resistance of the semi-fixed resistor 88 can be expressed as $R_1/n$. A given grading on a scale which is applied to the dial 95 may be brought into coincidence with an index 96, which is imprinted on the body of the camera, to change the value of n to 1, 2, 3 . . .

When the power supply to the camera is turned on in response to the depression of a shutter button, the reference voltage VR is applied to the non-inverting input terminal of the amplifier 71. Representing the resistance of the resistor 74 by $R_2$, the collector current of the transistor 73 is equal to $VR/R_2$. Representing the current amplification factor of the transistor 73 by $\beta$, the base current of this transistor is equal to $VR/\beta R_2$. In this manner, the output voltage $V_1$ from the amplifier 71 as referenced to the reference voltage VR provides a voltage across the emitter and base of the transistor 73. Thus, voltage $$V_1 = (kT/q)\ln\left(1 + \frac{VR}{\beta R_2 I_\alpha}\right),$$

where $I_\alpha$ represents the reverse saturation current across the emitter-base junction of the transistor 73. Since the base-emitter paths of the transistors 75, 76, 77 are biased by a constant voltage defined by the voltage $V_1$, there occurs a logarithmically expanded current corresponding to the magnitude of the voltage $V_1$ and which flows through the collector of each transistor 75, 76, 77. Assuming that the transistors 73, 75, 76 and 77 are formed in one IC package to exhibit an identical characteristic, or so as to provide an equal collector current for a given magnitude of emitter-base voltage, the current mirror effect produces a collector current for each of the transistors 75, 76, 77 which is equal to $VR/R_2$. Accordingly, the collector potential of the transistor 75 which is applied to the amplifier 85 to serve as a decision level VA is defined as the supply voltage Vcc minus a voltage drop across the resistor 87, or $VA=Vcc-R_1VR/R_2$. The collector potential of the transistor 76 which is applied to the amplifier 86 to serve as a decision level VB is equal to the supply voltage Vcc minus a voltage drop across the semi-fixed resistor 88, or $VB=Vcc-R_1VR/nR_2$.

Figure 8:
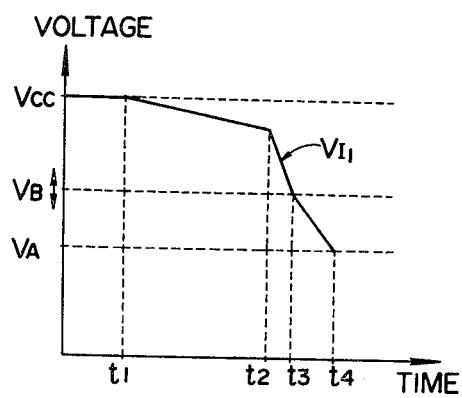
FIG. 8 graphically shows a change in an integrated voltage produced by the multiple light emission control system of FIG. 6.

When light from an object being photographed impinges upon the transducer element 97 after the upward movement of the movable mirror, there occurs a photocurrent Is1 which flows through the transducer element 97. The collector current of the transistor 77 is equal to $VR/R_2$, and hence, representing the resistance of the variable resistor 78 by $R_{ASA}$, there is applied to the non-inverting input terminal of the amplifier 80 a sum of a voltage $VR \cdot R_{ASA}/R_2$ representing film speed information and a logarithmically compressed voltage $(kT)/q \cdot \ln Is1$ which corresponds to the photocurrent Is1. The same voltage is also applied across the base and emitter of the logarithmic expansion transistor 81. A collector current Ic which represents a logarithmic expansion of this voltage flows through the transistor 81 and the trigger switch 84 which is now closed. When a first shutter blind begins running and the trigger switch 84 is opened at time $t_1$, the current Ic flows through the integrating capacitor 82, which then begins to be charged. An integrated voltage VI1 which is applied to the inverting input terminals of the amplifiers 85, 86 is maintained at the level of the supply voltage Vcc during the time the trigger switch 84 remains closed, but at time $t_1$ when the trigger switch 84 is opened, it changes with an increasing integrated voltage across the capacitor 82 in the manner of $VI1=Vcc-1/C_1 \int Ic dt$, as indicated in FIG. 8, where $C_1$ represents the capacitance of the integrating capacitor 82.

When the first shutter blind completes its running to fully open the shutter at time $t_2$, the electronic flash 61 (A, B; see FIGS. 1 and 3) begins the emission of light. Reflected light from the object being photographed which is illuminated by the flashlight from the electronic flashes A, B immediately impinges upon the transducer element 97 to increase the photocurrent Is1, which in turn increases the current flow Ic, thus causing the integrated voltage VI1 to decrease with a steep gradient. Since the decision levels are related such that $VA<VB$, when the integrated voltage VI1 decreases below the decision level VB initially at time $t_3$, the output from the amplifier 86 changes to the positive polarity, whereby the output of terminal 93 changes into the negative, delivering the emission interrupt signal $T_B$. In this manner, one of the electronic flashes, B, is interrupted to emit its flashlight in the same manner as mentioned above in connection with the first embodiment.

When the integrated voltage VI1 further decreases below the decision level VA at time $t_4$, the output of the amplifier 85 changes to the positive polarity, whereby the output terminal 92 assumes a negative value, thus delivering the emission terminate signal $T_A$. Hence, the other electronic flash A is interrupted from emitting flashlight. At the time the emission terminate signal $T_A$ is produced, the coil 89 is deenergized, allowing a second shutter blind to run, thus terminating an exposure.

In the described control system 94, by turning the dial 95 to change the resistance $R_1/n$ of the semi-fixed resistor 88, the decision level VB for the amplifier 86 which controls the emission of light from the electronic flash B can be changed up and down. In this manner, the relative emission of light from the electronic flashes A and B can be changed in a manner similar to that mentioned above in connection with the multiple light emission control system 23.

Figure 9:
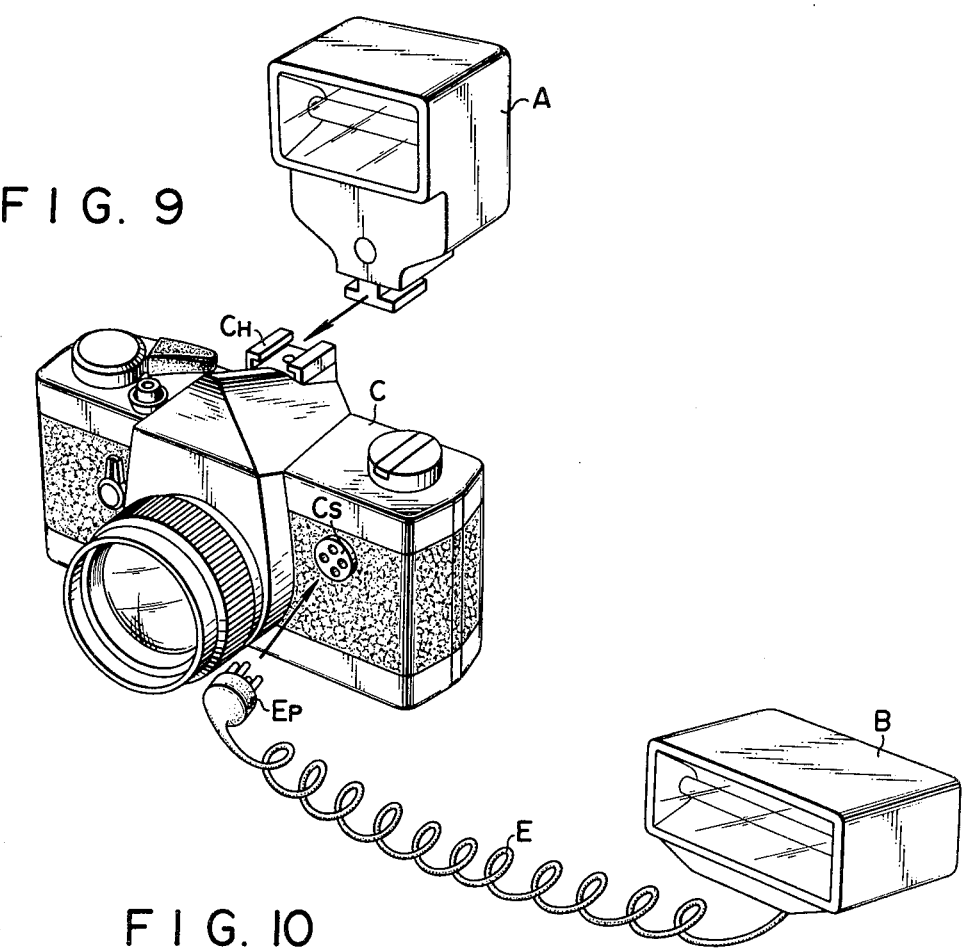
FIG. 9 is a perspective view illustrating a technique whereby a plurality of TTL electronic flashes are connected to a camera.

The interconnection between the camera C and the electronic flashes A, B can be made by the use of the cords $E_A$, $E_B$ as shown in FIG. 1. Alternatively, as shown in FIG. 9, the electronic flash A may be mounted on a hot shoe CH, which is in itself well known, of the camera C while the electronic flash B may be disposed at a desired location and connected with the camera through a cord E. In this instance, the hot shoe CH transmits the emission initiate signal and emission interrupt signal $T_A$ while a socket Cs on which the plug Ep of the cord E is mounted transmits the emission initiate signal and emission interrupt signal $T_B$.

Figure 10:
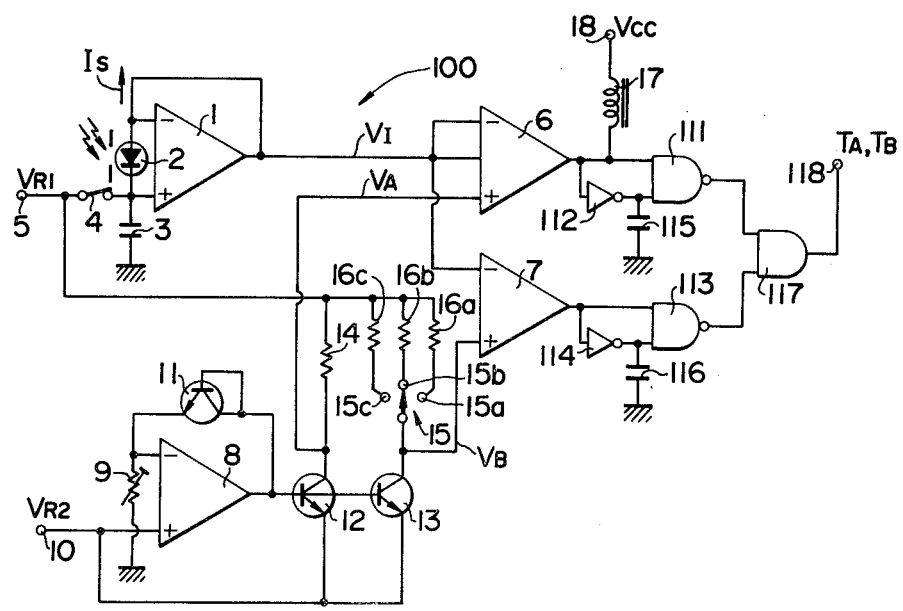
FIG. 10 is a circuit diagram of a multiple light emission control system according to a further embodiment of the invention.

FIG. 10 is a circuit diagram of a multiple light emission control system according to a further embodiment of the invention. The control system 100 shown is essentially of the same construction as the control system 23 shown in FIG. 2, and hence corresponding parts are designated by like reference characters without repeating their description. The control system 100 differs from the control system 23 in the arrangement of producing the emission interrupt signals $T_A$, $T_B$ on the output side of the operational amplifiers 6, 7 which form comparators. Specifically, the output terminal of the amplifier 6 is connected to one end of the coil 17, to one input of NAND gate 111 and also connected to the other input of gate 111 through an inverter 112. Similarly, the output terminal of the amplifier 7 is connected to one input of NAND gate 113 and also connected to the other input thereof through an inverter 114. The output terminals of the inverters 112, 114 are connected to the ground through capacitors 115, 116, respectively, and the output terminals of NAND gates 111, 113 are connected to input terminals of AND gate 117. The output terminal of AND gate 117 is connected to an output terminal 118 which is common to the delivery of both emission terminate signals $T_A$, $T_B$.

Figure 11:
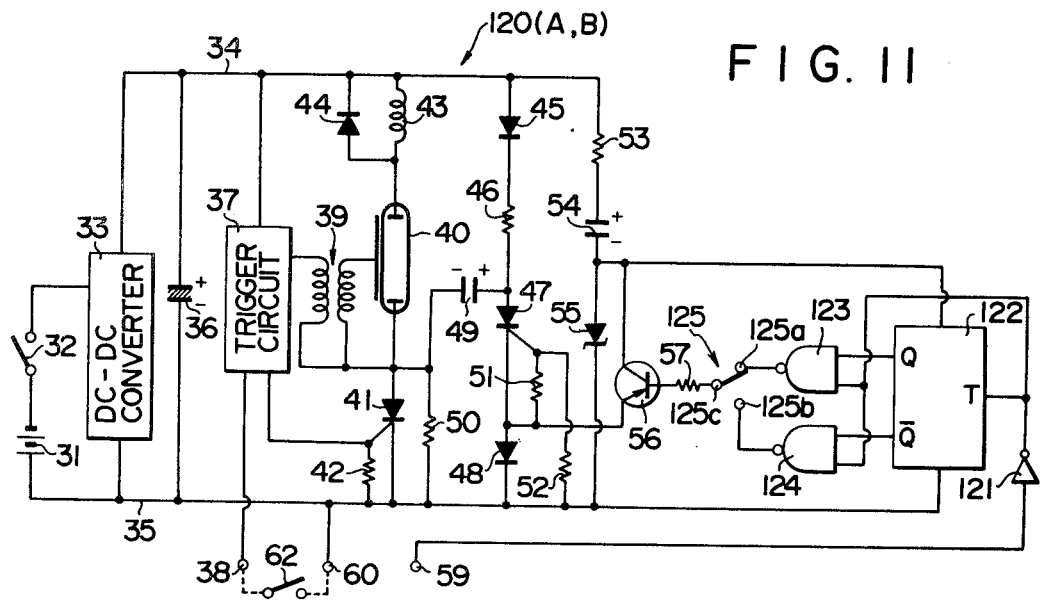
FIG. 11 is a circuit diagram of one form of TTL electronic flash which is adapted to cooperate with the control system shown in FIG. 10.

FIG. 11 shows a circuit diagram of an electronic flash A or B which is adapted to cooperate with the camera incorporating the multiple light emission control system 100. Specifically, an electronic flash 120 (A, B) is essentially of the same construction as the electronic flash 61 shown in FIG. 3, except for the provision of a circuit between the input terminal 59, receiving the emission interrupt signal, and the transistor 56 which is effective to separate the emission terminate signals $T_A$ and $T_B$ from each other. Thus, the input terminal 59 is connected through an inverter 121 to a trigger input terminal T of a T-type flipflop 122 and also to one input of each of NAND gates 123, 124. The T-type flipflop 122 includes supply terminals which are connected across the Zener diode 55. The flipflop 122 also includes output terminals Q, $\overline{Q}$, which are connected to the other inputs of NAND gates 123, 124, respectively. The output terminal of NAND gate 123 is connected to a fixed contact 125a of a signal changeover switch 125 while the output terminal of NAND gate 124 is connected to the other fixed contact 125b of the switch 125. The switch 125 includes a movable contact 125c which is connected through the resistor 57 to the base of the transistor 56. It is to be understood that a pair of electronic flashes as shown are provided (corresponding to A and B), and that the switch 125 of the electronic flash A has its movable contact 125c thrown to the contact 125a while the switch 125 of the other electronic flash B has its movable contact 125c thrown to the contact 125b.

Figure 12:
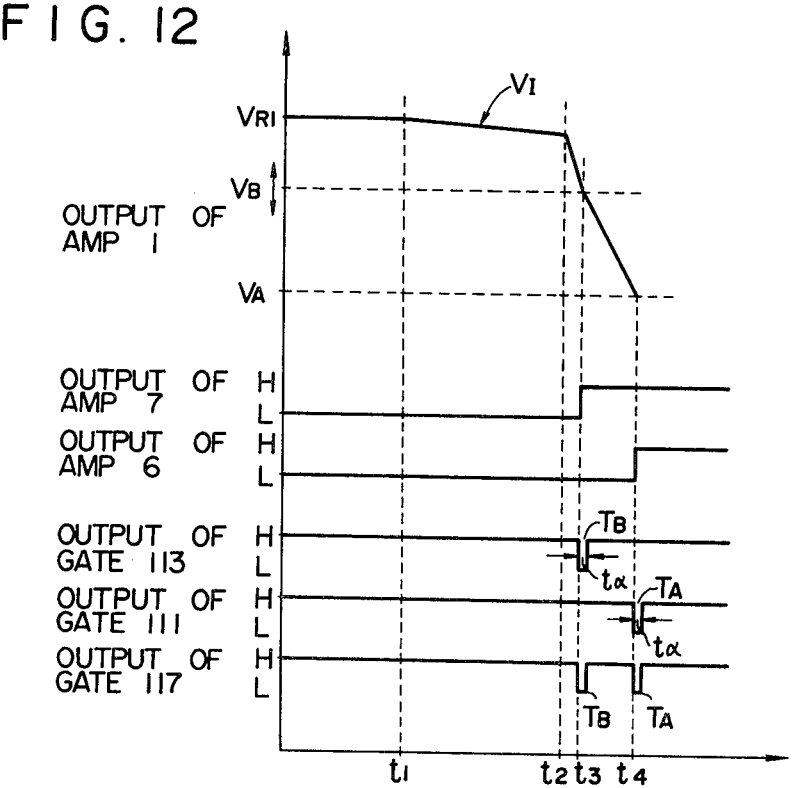
FIG. 12 is a series of timing charts illustrating the level of signals appearing at various parts of the control system shown in FIG. 10.

The operation of the control system 100 will now be described together with the operation of the electronic flash 120 (A, B) shown in FIG. 11, principally pointing out a difference over the operation of the control system 23 shown in FIG. 2. Referring to FIG. 12, the synchro contacts 62 are closed at time $t_2$ to cause a simultaneous emission of flashlight from the electronic flashes A, B. Reflected light from an object being photographed impinges upon the transducer element 2, whereby the integrated voltage VI rapidly decreases. At time $t_3$ when the integrated voltage decreases below the decision level VB which is determined by either resistor 16b or 16a or 16c, the output from the amplifier 7 changes from the negative to the positive (hereafter referred to as "L" and "H", respectively). When the output of the amplifier 7 changes to "H", this output is supplied to one input of NAND gate 113, and the output of the inverter 114 changes to "L". However, because the capacitor 116 has been charged by the "H" output of the inverter 114 during the time the amplifier 7 produces "L" output, the other input to NAND gate 113 maintains the "H" level for a brief period $t_\alpha$ which is required for the capacitor 116 to discharge, followed by turning to "L" level. Accordingly, there is produced an "L" pulse having a pulse width $t_\alpha$ at time $t_3$ at the output terminal of NAND gate 113. The "L" pulse is fed to the output terminal 118 as the emission interrupt signal $T_B$, through AND gate 117. As the integrated voltage VI further reduces, and reduces below the decision level VA determined by the resistor 14 at time $t_4$, the output of the amplifier 6 changes from "L" to "H". In response thereto, there is produced an "L" pulse of a width $t_\alpha$ at time $t_4$ at the output terminal of NAND gate 111 in a manner similar to that mentioned above. This pulse is also fed as the emission interrupt signal $T_A$ to the output terminal 118 through NAND gate 117. Thus, the emission interrupt signals $T_A$, $T_B$ which are used to terminate the emission of light from the electronic flashes A and B are both fed to the output terminal 118. Accordingly, the number of electrical contacts which must be provided on the part of the camera for an electrical connection with the electronic flash or flashes is reduced.

The output terminal 118 is connected to the input terminal 59 of the electronic flash A, B (120). Thus, the emission interrupt signals $T_B$, $T_A$ are sequentially applied to the terminal 59. Initially, when the emission interrupt signal $T_B$ is applied at time $t_3$, the Q output of the T-type flipflop 122 changes the "L" to "H" while $\overline{Q}$ output changes from "H" to "L". Subsequently at time $t_4$ when the emission interrupt signal $T_A$ is applied to the terminal 59, the Q output changes to "L" while the $\overline{Q}$ output changes to "H". Consequently, the emission interrupt signal $T_B$ appears at the output terminal of NAND gate 123 while the emission interrupt signal $T_A$ appears at the output terminal of NAND gate 124. The switch 125 operates to connect the output terminal of NAND gate 123 to the base of the transistor 56 in the electronic flash B, and to connect the output terminal of NAND gate 124 to the base of the transistor 56 in the electronic flash A. Therefore, at time $t_3$, the emission interrupt signal $T_B$ is applied to the base of the transistor 56 of the electronic flash B, thus terminating the emission of flashlight from the flash discharge tube 40 of the electronic flash B. At the $t_4$ when the emission interrupt signal $T_A$ is applied to the base of the transistor 56 of the electronic flash A, the emission of flashlight from the flash discharge tube 40 of the electronic flash A is terminated.

It will be appreciated from the foregoing that the relative emission of light from the electronic flashes A and B can be suitably chosen in the multiple emission control system 100 in the same manner as achieved in the control systems 23 and 94, by establishing a suitable decision level for comparison with the integrated voltage. The electronic flashes A and B are controlled to terminate the emission of flashlight, with the electronic flash B first, and followed by the electronic flash A, in response to the emission interrupt signals $T_B$, $T_A$ which are produced in accordance with the desired relative emission of light.

In the described embodiments, a control of emission of flashlight from a pair of electronic flashes has been described. However, a similar arrangement may be made to produce more than two emission interrupt signals so that three or more electronic flashes may be controlled.

Also, in the described embodiments, a plurality of electronic flashes have been simultaneously triggered into emission of light while the emission of light from the individual electronic flashes has been interrupted in accordance with a preset relative emission of light. However, a plurality of electronic flashes may be sequentially operated in a manner such that the interruption of emission from one of the electronic flashes triggers another electronic flash into emission, with the individual electronic flashes being controlled to achieve a desired relative emission of light.

FIG. 14 is a circuit diagram of a multiple light emission control system according to still another embodiment of the invention which achieves such a sequential control. It is to be understood that the electrical circuit shown is assembled into a signal lens reflex camera of TTL photometry type.

Specifically, a photocurrent integrating circuit includes an operational amplifier 201 having its inverting and non-inverting input terminals connected to the anode and the cathode, respectively, of a photoelectric transducer element 202 such as a photodiode which is provided for the purpose of photometry. The non-inverting input terminal is connected to the ground through an integrating capacitor 203, and is also connected through an analog switch 204 to a terminal 205, to which a first reference voltage VR10 is applied. The analog switch 204 includes a control terminal which is connected to a trigger terminal 236, to which a trigger signal St of "L" level is applied in interlocked relationship with an upward movement of a movable mirror upon a shutter release operation. The inverting input terminal of the amplifier 201 is connected to an output terminal thereof, which is in turn connected to the inverting input terminals of operational amplifiers 206, 207, each of which forms a comparator.

A film speed presetting circuit includes an operational amplifier 208, the inverting input terminal of which is connected to the ground through a variable resistor 209 which is used to preset a desired film speed. The amplifier 208 also includes a non-inverting input terminal connected to a terminal 210, to which a second reference voltage VR20 is applied. The inverting input terminal of the amplifier 208 is connected to the emitter of an NPN transistor 211 which is provided for purpose of providing a logarithmic compression. The transistor 211 has its base and collector connected together and connected to the output terminal of the amplifier 208. The output terminal of the amplifier 208 is connected to the bases of NPN transistors 212, 213 which serve a logarithmic expansion. The collector of the transistor 212 is connected to the non-inverting input terminal of the amplifier 206 and is also connected to the terminal 205 through a resistor 214, the value of which is chosen in accordance with the desired emission of light. The collector of the transistor 213 is connected to the non-inverting input terminal of the amplifier 207 and is also connected to a movable contact 215d of a changeover switch 215 which is used to vary a relative emission of light. The switch 215 includes fixed contacts 215a, 215b, 215c, which are connected to one end of resistors 216a, 216b, 216c, all chosen to establish a desired emission of light. The other ends of these resistors are connected in common to the terminal 205. The emitters of the transistors 212, 213 are connected in common and connected to the terminal 210.

The output terminal of the operational amplifier 206 is connected to a terminal 218, to which a supply voltage Vcc is applied, through a coil 217 of an electromagnet which constrains a second shutter blind under the charged condition of the shutter, and is also connected through an inverter 219 to a second output terminal 221 which is adapted to deliver an emission interrupt signal. The output terminal of the operational amplifier 207 is connected through an inverter 220 to a first output terminal 222 which is adapted to deliver an emission interrupt signal. It is to be noted that the first output terminal 222 delivers an emission interrupt signal $T_{A0}$ to the first electronic flash A (see FIG. 1) while the second output terminal 221 delivers an emission interrupt signal $T_{B0}$ to the second electronic flash B. The output terminal of the amplifier 207 is also connected to the base of PNP transistor 226 through an inverter 224 and resistor 225, in order to supply an emission initiate signal $F_{B0}$ to the second electronic flash B when delivering the emission interrupt signal $T_{A0}$ to the first electronic flash A. The transistor 226 has its emitter connected to the supply terminal 218 and its collector connected to the ground through a series combination of resistors 227, 228, with the junction therebetween connected through a capacitor 229 to the gate of a thyristor 230. The thyristor 230 has its anode connected to a second output terminal 231 which is adapted to deliver an emission initiate signal, and its cathode connected to the supply terminal 218. A resistor 232 is connected across the cathode and gate of the thyristor. The second output terminal 231 delivers the emission initiate signal $F_{B0}$ to the electronic flash B.

In order to deliver an emission initiate signal $F_{A0}$ to the first electronic flash A in synchronized relationship with the shutter operation of the camera C, there is provided an NPN transistor 234 which has its base connected through a resistor 235 to a trigger terminal 236, to which the trigger switch St is applied. The transistor 234 has its emitter connected to the ground and its collector connected to the junction between a resistor 237 and capacitor 238 which are connected in series across the supply terminal 218 and the ground. The collector is also connected to the inverting input terminal of an operational amplifier 239 which forms a comparator. The non-inverting input terminal of the amplifier 239 is connected to the junction between a pair of resistors 240, 241 which are connected in series across the supply terminal 218 and the ground. The output terminal of the amplifier 239 is connected through a resistor 242 to the base of PNP transistor 243. The transistor 243 has its emitter connected to the supply terminal 218 and its collector connected to the ground through a pair of series connected resistors 244, 245, with the junction therebetween connected through a capacitor 246 to the gate of a thyristor 247. The thyristor 247 has its anode connected to a first output terminal 248 which is adapted to deliver the emission initiate signal, and its cathode connected to the supply terminal 218. A resistor 249 is connected across the cathode and gate of the thyristor 247. The first output terminal 248 delivers the emission initiate signal $F_{A0}$ to the first electronic flash A.

The multiple light emission control system 250 thus constructed may be used in combination with a first and a second electronic flash A and B which may be constructed in the manner illustrated in FIG. 3, for example, so as to control the emission of light therefrom in accordance with the emission initiate signals $F_{A0}$, $F_{B0}$ and the emission interrupt signals $T_{A0}$, $T_{B0}$.

The operation of the control system 250 shown in FIG. 14 will be described together with the operation of the electronic flash 61 (A, B) shown in FIG. 3. Initially, the camera C of TTL direct photometry type incorporating the multiple light emission control system 250 is connected with the first and the second electronic flash A, B by means of cords $E_A$, $E_B$, and the electronic flashes are disposed at an equal distance from an object being photographed and directed thereto. As a result of such interconnection, the first initiate output terminal 248 of the control system 250 is connected to the input terminal 38 of the first electronic flash A, and the second initiate output terminal 231 of the control system 250 is connected to the input terminal 38 of the second electronic flash B. The first terminate output terminal 222 of the control system 250 is connected to the input terminal 59 of the first electronic flash A and the second terminate output terminal 221 of the control system is connected to the input terminal 59 of the second electronic flash B.

It is to be noted that in the present embodiment, the input terminals 38 of the respective electronic flashes A, B are supplied with the emission initiate signals $F_{A0}$, $F_{B0}$ from the camera, and hence the synchro contacts 62 of the camera are not connected to the input terminals 38. The ground terminals 60 of the first and the second electronic flash A and B are connected to a ground terminal (not shown) of the control system 250.

A relative emission of flashlight from the electronic flashes A and B is established in accordance with a photographing intent of a user, by suitably changing the changeover switch 215.

Assume that the resistor 214 has a resistance R and resistors 216a, 216b, 216c have resistances of $R/n_1$, $R/n_2$, $R/n_3$ ($1 < n_1 < n_2 < n_3$). It is also assumed that the changeover switch 215 is thrown to the contact 215b to connect the resistor 216b with the collector of the transistor 213, as shown in FIG. 14.

Figure 15:
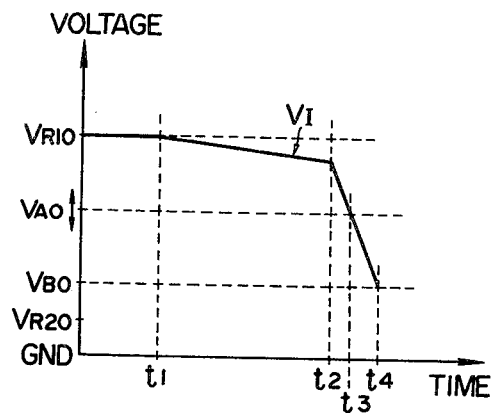
FIGS. 15 and 16 graphically show a change in an integrated voltage produced by the control system of FIG. 14.

When the power switch 32 of the electronic flash 61 (A, B) is closed, the main capacitor 36 is charged. The depression of a shutter button of the camera C causes a movable mirror (not shown) to move up, whereby the power switch (not shown) of the camera is closed, thus applying the supply voltage Vcc and the reference voltages VR10, VR20 in the circuit arrangement of FIG. 14. The trigger terminal 236 assumes an "H" level whenever the trigger signal St is not applied thereto, and hence the analog switch 204 remains closed, whereby the reference voltage VR10 applied to the terminal 205 is applied through the switch 204 to charge the integrating capacitor 203. The application of the reference voltage VR20 to the terminal 210 produces a current flow of $VR20/R_{ASA}$ through the variable resistor 209 where $R_{ASA}$ represents the resistance of the resistor 209. Accordingly, a logarithmically compressed voltage $V_{ASA}=(kT/q)\ln(VR20/R_{ASA})$ is developed at the output terminal of the amplifier 208. As will be evident, k represents the Boltzmann's constant, T absolute temperature and q the charge of an electron. The voltage $V_{ASA}$ representing film speed information is applied to the bases of the transistors 212, 213, each of which produces a collector current $VR20/R_{ASA}$ as a result of the logarithmic expansion of the voltage $V_{ASA}$ by the current mirror circuit formed by the transistors 211 to 213. Accordingly, the transistor 212 has a collector potential $VB0=VR10-(R/R_{ASA})VR20$ while the transistor 213 has a collector potential $VA0=VR10-(R/nR_{ASA})VR20$. The voltage VA0 defines a decision level for the amplifier 207 while the voltage VB0 defines a decision level for the ampliier 206. As illustrated in FIG. 15, there applies an inequality VR10>VA0>VB0>VR20.

At time $t_1$ when the upward movement of the movable mirror has been completed and the first shutter blind begins to run, the trigger signal St of "L" level is applied to the trigger terminal 236, thereby opening the switch 204. Thereupon, the integrating capacitor 203 which has been charged to the level of the reference voltage VR10 begins discharging from time $t_1$ on, in proportion to the photocurrent Is from the transducer element 202 which is responsive to light from an object being photographed. In this manner, an integrating operation is initiated. The amplifier 201 delivers an integrated voltage $VI=VR10-1/C\int I s dt$, as illustrated in FIG. 15, which is applied to the amplifiers 206 and 207. It is to be noted that C represents the capacitance of the capacitor 203. Since now the integrated voltage VI is higher than either decision level VA0, VB0, both amplifiers 206, 207 produce an "L" output, whereby the first and the second output terminals 221, 222 assume an "H" level. The coil 217 is maintained energized, constraining the second shutter blind from running. Since the transistor 226 is off at this time, the circuit which produces the emission initiate signal supplied to the second electronic flash B is not activated.

The application of the trigger signal St to the trigger terminal 236 turns the transistor 234 off at time $t_1$, thus initiating a charging of the capacitor 238. The voltage across the capacitor 238 increases with a time constant which is determined by the capacitor 238 and resistor 237. So long as the voltage across the capacitor 238, which is applied to the inverting input terminal of the amplifier 239, remains below the voltage applied to the non-inverting input terminal and which is determined by voltage divider resistors 240, 241, the amplifier 239 produces an "H" output, maintaining the transistor 243 off. Accordingly, the circuit which produces the emission initiate signal supplied to the first electronic flash A is not activated.

When the capacitor 238 continues to be charged during a delay time determined by the time constant, the running of the first shutter blind is completed at time $t_2$, leaving the shutter fully open. Thereupon, the output from the amplifier 239 changes to its "L" level, whereby the transistor 243 is turned on. Then the capacitor 246, which has been charged to the polarity shown during the time the transistor 243 remains off, discharges through a path including the gate-cathode path of the thyristor 247 and the emitter-collector path of the transistor 243 and the resistor 244, thereby turning the thyristor 247 on. The first initiate output terminal 248 then assumes an "H" level, thus producing the emission initiate signal $F_{A0}$. This emission initiate signal is fed through the input terminal 38 of the first electronic flash A (61) to the trigger circuit 37. In response thereto, the trigger circuit 37 within the electronic flash A is activated, applying a trigger pulse to the trigger electrode 40a of the flash discharge tube 40 through the trigger transformer 39, and simultaneously applying a gate pulse to the gate of the thyristor 41 to allow the emission of flashlight from the tube 40. In response thereto, the object D is illuminated from the left-hand side, as viewed in FIG. 1. The reflected light from the object D immediately impinges upon the transducer element 202 which is disposed within the camera C, and hence the integrated voltage VI decreases with a stepper slope from time $t_2$ on, as indicated in FIG. 15.

When the integrated voltage VI decreases below the decision level VA0 at time $t_3$, the output from the amplifier 207 changes to its "H" level, whereby the first terminate output terminal 222 assumes an "L" level. This voltage is applied, as the emission interrupt signal $T_{A0}$, to the base of the transistor 56 of the electronic flash A, thus turning it on. As before, the capacitor 54 has been charged to the same voltage as the capacitor 36 during the time the latter is charged, and now discharges through a path including the resistor 53, coil 43, tube 40, thyristor 41 and Zener diode 55 in response to the discharge of the flash discharge tube 40, thus developing a constant voltage across the Zener diode 55 which is determined by the breakdown voltage thereof. The voltage drop across the Zener diode 55 serves as a power supply to supply the emitter current of the transistor 56 as it is turned on to the gate-cathode path of the thyristor 47, thus turning it on. Thereupon, the commutating capacitor 49 which has been charged to the polarity shown discharges through a path including the thyristor 47, diode 48 and thyristor 41, thus turning the thyristor 41 off to interrupt the discharge circuit for the tube 40 to thereby interrupt the emission of light from the discharge tube 40.

It will be noted that when the emission interrupt signal $T_{A0}$ is supplied to the first electronic flash A, the "H" output from the amplifier 207 turns the transistor 226 on. Thereupon, the capacitor 229 which has been charged to the polarity shown during the time the transistor 226 remains off discharges through a path including the gate-cathode path of the thyristor 230, the emitter-collector path of the transistor 226 and resistor 227, thus turning the thyristor 230 on. This allows the second initiate output terminal 231 to assume an "H" level, thus producing the emission initiate signal $F_{B0}$ at this terminal. The emission initiate signal $F_{B0}$ is supplied through the input terminal 38 of the second electronic flash B (61) to the trigger 37, which is then activated to initiate the emission of flashlight therefrom in a manner similar to that the first electronic flash A. In other words, the second electronic flash B initiates its emission of flashlight in continued relationship with the electronic flash A as the latter ceases to emit flashlight at time $t_2$.

As the integrated voltage VI further reduces below the decision level VB0 at time $t_4$, the output from the amplifier 206 changes to its "H" level, whereby the second output terminal 221 assumes an "L" level. The voltage of "L" level developed at the second terminate output terminal 221 is supplied, as the emission terminate signal $T_{B0}$, to the base of the transistor 56 of the second electronic flash B, thus turning it on. In a similar manner as before, the emission of flashlight from the flash discharge tube 40 of the electronic flash B is interrupted. At the same time as the emission interrupt signal $T_{B0}$ is supplied to the second electronic flash B, the coil 217 is deenergized, releasing the second shutter blind from constraint to allow it to run, thus terminating an exposure.

It will be appreciated that the decision level VA0 for the amplifier 207 which is used to control the emission of flashlight from the first electronic flash A is changed by operating the changeover switch 215. When the switch 215 is thrown to the fixed contact 215a to connect the resistor 216a with the collector of the transistor 213, the reduced resistance $R/n_1(1<n_1<n_2)$ of the resistor 216a establishes a lower decision level than the decision level VA0, and accordingly the emission interrupt signal $T_{A0}$ is produced at a later point in time, increasing the relative proportion of light emission from the electronic flash A with respect to light emission from the electronic flash B. When the switch 215 is thrown to the fixed contact 215c to connect the resistor 216c with the transistor 213, the reduced resistance $R/n_3(n_3>n_2)$ of the resistor 216a establishes a higher decision level than the decision level VA0 which is obtained when the resistor 216b is chosen. Consequently, the emission interrupt signal $T_{A0}$ is produced at an earlier point in time, decreasing the relative proportion of light emission from the electronic flash A with respect to light emission from the electronic flash B.

Figure 16:
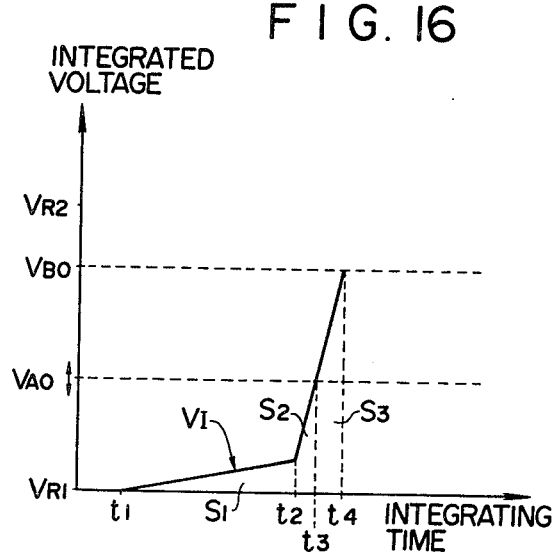

The variation of the integrated voltage VI shown in FIG. 15 is illustrated on a reverse scale in FIG. 16. In FIG. 16, an area $S_1$ defined below the characteristic curve representing the voltage VI between times $t_1$ and $t_2$ represents an exposure supplied by natural light, an area $S_2$ defined below the curve between times $t_2$ and $t_3$ represents an exposure supplied by the flashlight from the electronic flash A, and an area $S_3$ defined below the curve between times $t_3$ and $t_4$ represents an exposure supplied by the flashlight from the second electronic flash B. As described in the above embodiment, by changing the point in time, $t_3$, at which the emission of flashlight from the electronic flash A is interrupted, by means of the changeover switch 215, the relative proportion of light emission from the electronic flashes A and B can be suitably chosen, and the electronic flash B may be allowed to provide an emission of flashlight in accordance with such relative proportion, in continued relationship with the emission from the electronic flash A. Assuming that the decision level VB0 corresponds to a film speed of ASA100 and that the decision level VA0 corresponds to an exposure level which is $-2EV$ therefrom or corresponds to a film speed of ASA400, the resulting relative proportion between the electronic flashes A and B will be 1:3. It will be understood that this relative proportion is maintained constant within the control capability of the present system, independently from the relative position of the electronic flashes A and B and the object D being photographed or the relative position of the electronic flashes A and B to each other or the presence or absence or a diffuser.

Figure 17:
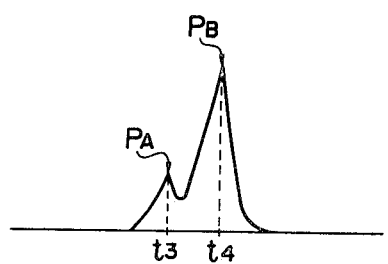
FIG. 17 graphically shows the waveform representing the emission of light from a pair of electronic flashes which are operated in accordance with the multiple light emission control system of the invention.

FIG. 17 graphically shows a waveform which represents the actual emission of light from the electronic flashes A and B. The initial peak PA coincides in time with the time $t_3$ when the emission of flashlight from the electronic flash A is interrupted, and the next higher peak PB coincides with the time $t_4$ when the emission of flashlight from the electronic flash B is interrupted.

A control of a pair of electronic flashes has been described in connection with the above embodiment, but it should be understood that a multiple light emission control utilizing more than two electronic flashes can be provided in a similar manner, by employing an arrangement in which more than two emission initiate or interrupt signals can be sequentially delivered in accordance with a desired relative proportion of light emission and as a result of TTL photometry, and delivering an emission initiate signal to an electronic flash whenever an emission interrupt signal is delivered to a preceding electronic flash.

What is claimed is:

1. A multiple light emission control system for operating a plurality of independent electronic flash means, said system comprising:

each of said flash means being coupled to said control system to enable independent positioning of each flash means relative to the camera and to the object being photographed;

means for energizing all of said electronic flash means substantially simultaneously responsive to a signal indicating the opening of the shutter of a camera associated with said control system;

each of said electronic flash means having means for terminating the emission of flash light therefrom in response to receipt of an emission interrupt signal;

said control system including photometry means for controlling photometry of reflected light from an object being photographed which passes through a taking lens of a camera for generating a signal representing the reflected light;

first determining means responsive to said photometry means for determining a point in time when a desired amount of exposure has been reached for generating a shutter closing signal;

means responsive to said shutter closing signal for applying a first emission interrupt signal to a selected one of said electronic flash means;

second determining means independent of said first determining means coupled to said photometry means for developing a second emission interrupt signal, including selection means for selectively controlling the time occurrence of said second emission interrupt signal relative to the first mentioned emission interrupt signal over a range whose outer limits permit the second interrupt signal to occur before or after the occurence of the first emission interrupt signal for thereby adjusting the proportional amount of flash light provided by said plurality of electronic flash means.

2. The control system of claim 1, in which said means for generating a second emission interrupt signal comprises a comparator for comparing the photometry signal against a predetermined threshold;

said selection means comprising means for adjusting said predetermined threshold.

3. The control system of claim 2, in which said comparator comprises an operational amplifier having inverting and non-inverting input terminals;

said selection means comprising a resistor coupled between a reference voltage and one of the input terminals of said operational amplifier, said photometry signal being coupled to the other input of said operational amplifier.

4. A control according to claim 2, in which said selection means comprises a plurality of fixed resistors and a change over switch for coupling a reference voltage to one input of said comparator through a selected one of said fixed resistors, each of said fixed resistors having a resistance value which is different from the remaining fixed resistors.

5. The control system of claim 3 wherein said resistor comprises an adjustable resistor.

6. The control system of claim 1, wherein said means for generating a shutter closing signal is connected to the output of said first mentioned emission terminate signal generating means together with an inverter, the output of said inverter coupling the first mentioned emission terminate signal to said selected electronic flash means.

7. The control system of claim 1, wherein each of said threshold means comprises a resistor coupling a reference voltage to one input of its associated comparator;

means for providing a uniform current flow through all of said resistors, at least one of said resistors being adjustable.

8. A multiple emission control system comprising:

photometry means for generating a signal representing the light reflected from an object being photographed;

a plurality of electronic flash means and means for energizing said electronic flash means responsive to the opening of a shutter in a camera employing with control means;

plural comparator means each having a predetermined threshold level for generating an emission terminate signal when the photometry signal is substantially equal to the associated threshold level;

the threshold level of at least one of said comparator means being adjustable;

logical gating means for combining the outputs of said comparator means;

each of said electronic flash means being connected to the output of said logical gating means and each having gating means and a changeover switch for selecting one of the emission terminate signals for terminating operation of the electronic flash means in accordance with the position of the changeover switch.

9. The control system of claim 8 further comprising plural means each for generating a pulse signal responsive to a output state of associated comparator means, said logical gating means coupling all of said pulses to all of said electronic flash means.

10. The control system of claim 9, wherein each of said electronic flash means comprises a bi-stable circuit having a control input coupled to receive said emission terminate pulses and first and second outputs;

said gating means including gates respectfully coupled to the first and second outputs of said bi-stable circuit and being coupled in common to the said control input;

means selectively coupled to one of said gates through said changeover switch for terminating operation of said electronic flash means responsive to receipt of one of said emission terminate pulses, the emission terminate pulse being coupled thereto being determined by the position of said changeover switch.

11. A plurality of electronic flash means and a control system for controlling the operation of said plurality of electronic flash means, wherein each of said electronic flash means is independent of the other and being capable of initiating and terminating the emission of the flash light respectively responsive to emission initiate and emission interrupt signals supplied from an associated camera containing said control system, each of said electronic flash means being coupled to the control electronic flash means system through independent connection cords, and each being capable of being positioned relative to the camera and the object being photographed independently of the camera and the remaining electronic flash means, said control system being arranged in the camera, and including:

means for delivering an emission initiate signal to a selected one of the plurality of electronic flash means responsive to a signal indicating the camera shutter is fully open to cause the selected electronic flash means to emit flash light;

photometry means positioned to receive light passing through the camera lens for generating a signal representing the light reflected from an object being photographed;

plural comparator means each including independent threshold means for generating emission terminate signals when the photometry means signal compares with its associated threshold levels;

at least one of said threshold means including adjustable means for adjusting the threshold level over a range whose upper and lower limits are respectively greater and smaller than the threshold levels of the remaining threshold means, said threshold levels being selected to cause said comparator means to switch their outputs in sequential fashion, and to provide time intervals of flash illumination which are different from one another;

the output of the first comparator means to generate an emission terminate signal being coupled to extinguish the electronic flash means which is first to be energized;

means responsive to the first generated emission terminate signal at the output of said first comparator means and being directly coupled to another one of said electronic flash means for substantially initiating operation of said another one of said electronic flash means.

12. The control system of claim 11, wherein each of said first independent means comprises a capacitor and means for charging said capacitor;

a transistor being rendered conductive by the output of said comparator means for discharging said capacitor; and a thyristor being rendered conductive responsive to discharge of said capacitor for generating an emission initiate signal sufficient for energizing the associated one of said electronic flash means.

13. The control system of claim 11, wherein each of said threshold means comprises a resistance element coupled to a reference source and one input of an associated one of said comparator means;

current generating means for providing and regulating the constant current in each of said threshold circuits whereby an equal constant current flows through each of said resistance elements;

said current generating means further comprising adjustable resistance means for adjusting the magnitude of the current provided by said current generating means, said adjustable resistance means comprising an adjustable resistance whose resistivity is adjusted as a function of film sensitivity of the film being used for photographing purposes.

14. The control system of claim 11, further comprising current generating means coupled to said photometry circuit and including adjustable resistance means for coupling an adjustable voltage which is a function of film sensitivity of the film used in the photographing operation to said current generating means for altering the photometry circuit output signal in accordance with film sensitivity.

15. The control system of claim 11, the output of each comparator being coupled to first independent means for generating an emission terminate signal and, except for the last comparator means of the group, the output of each comparator being coupled to independent second means for generating an emission initiate signal for a different one of said electronic flash means.

16. A multiple light emission control system for operating a plurality of independent electronic flash means, said system comprising:

means for energizing all of said electronic flash means substantially simultaneously responsive to the opening of the shutter of a camera associated with said control system;

each of said electronic flash means having means for terminating the emission of flash light therefrom in response to receipt of an emission interrupt signal;

said control system including photometry means for controlling photometry of reflected light from an object being photographed which passes through a taking lens of a camera for generating a signal representing the reflected light;

means responsive to said photometry means for determining a point in time when a desired amount of flashlight has been reached for generating an emission interrupt signal to a selected one of said electronic flash means;

means coupled to said photometry means for developing a second emission interrupt signal, including selection means for selectively controlling the time occurrence of said second emission interrupt signal relative to the first mentioned emission interrupt signal for thereby adjusting the proportional amount of flashlight provided by said electronic flash means.

* * * * *

UNITED STATES PATENT AND TRADEMARK OFFICE
CERTIFICATE OF CORRECTION

PATENT NO. : 4,457,602
DATED : July 3, 1984
INVENTOR(S) : Kazunori Mizokami

It is certified that error appears in the above-identified patent and that said Letters Patent is hereby corrected as shown below:

Column 1, line 59 change "The" to --To--.

Column 1, line 67 after "follows" insert --that--.

Column 4, line 37 change "port" to --part--.

Column 16, line 66 delete "that".

Claim 8, column 19, line 39 change "with" to --said--.

Signed and Sealed this

Twelfth Day of February 1985

[SEAL]

Attest:

DONALD J. QUIGG

Attesting Officer     Acting Commissioner of Patents and Trademarks